United States Patent [19]
Lester

[11] 3,942,826
[45] Mar. 9, 1976

[54] DOUBLE ECCENTRIC LOCK
[75] Inventor: Fritz O. Lester, Kalamazoo, Mich.
[73] Assignee: Liane E. Lester, Kalamazoo, Mich.
[22] Filed: Feb. 18, 1975
[21] Appl. No.: 550,529

Related U.S. Application Data
[63] Continuation of Ser. No. 419,674, Nov. 28, 1973, abandoned.

[52] U.S. Cl. .............................. 285/178; 403/350
[51] Int. Cl.² ......................................... F16L 55/00
[58] Field of Search ........... 285/178, 165; 403/350, 403/351, 352

[56] References Cited
UNITED STATES PATENTS
| | | | |
|---|---|---|---|
| 2,677,813 | 5/1954 | Shorp | 403/350 |
| 3,259,407 | 7/1966 | Welt | 403/350 |

FOREIGN PATENTS OR APPLICATIONS
| | | | |
|---|---|---|---|
| 661,755 | 11/1951 | United Kingdom | 403/350 |
| 764 | 1879 | United Kingdom | 403/350 |

Primary Examiner—Dave W. Arola
Attorney, Agent, or Firm—Gordon W. Hueschen

[57] ABSTRACT

A lock assembly for connecting two members such as two tubes, rods, lines, wiring, or cue stick sections, comprising a pair of complementary lock members, one male and one female, the male member having a cylindrical member coaxial or concentric with respect to the lock member adapted to rotate in a complementary chamber in the female member concentric or coaxial with respect to the female member, and a curvilinear such as cylindrical member eccentric with respect to the male member adapted to rotate in a chamber in said female member being eccentric with respect to the female member, the eccentric chamber of the female member being of larger diameter than that of the eccentric curvilinear member of the male lock member, and being adapted to engage the surface of the eccentric curvilinear portion of the male member upon relative rotation therebetween, whereby when the male and female members are rotated in either direction with respect to each other, the members are locked together.

2 Claims, 6 Drawing Figures

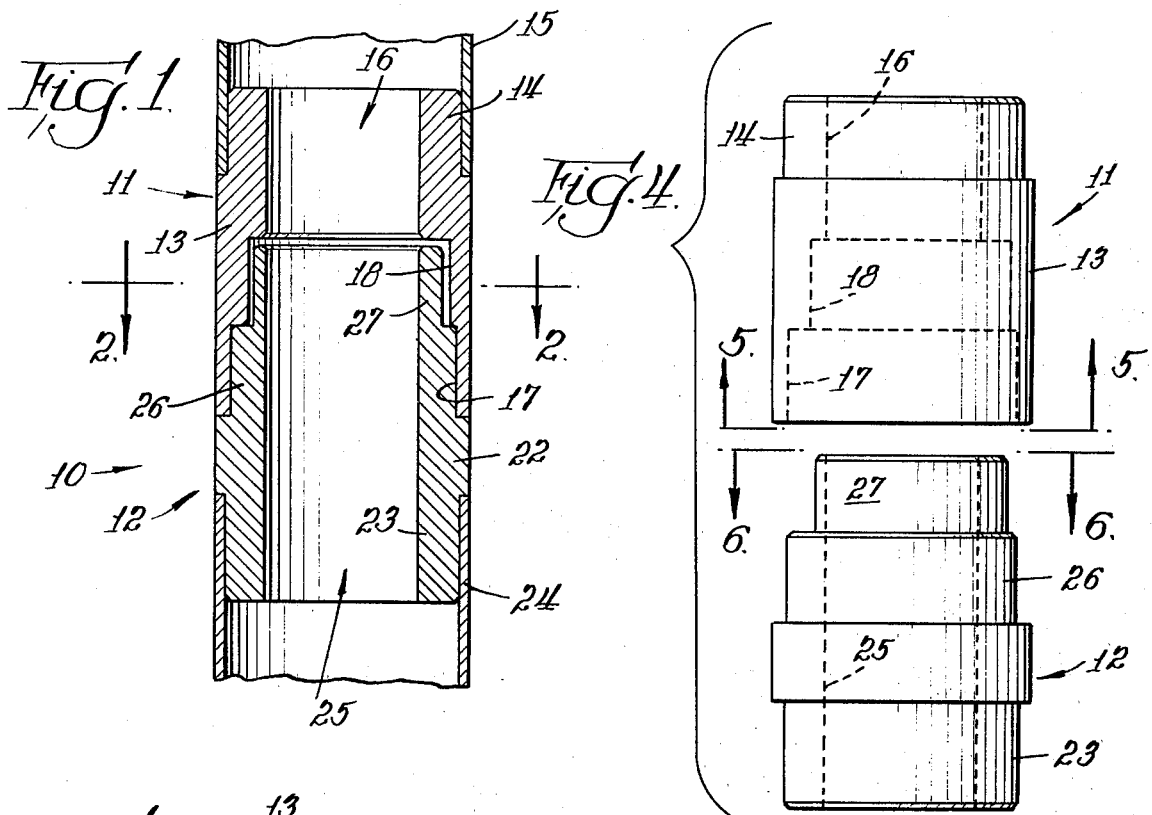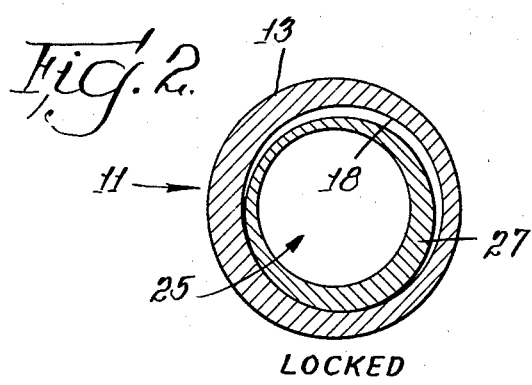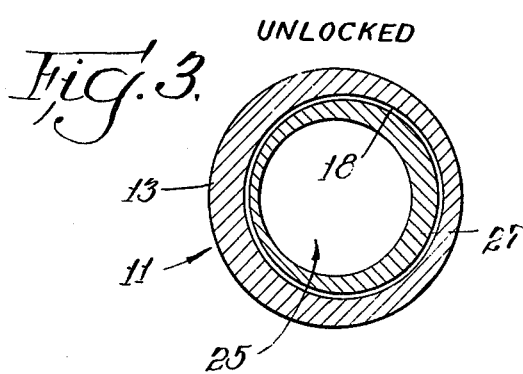

DOUBLE ECCENTRIC LOCK

This is a continuation of application Ser. No. 419,674, filed Nov. 28, 1973 now abandoned.

BACKGROUND OF THE INVENTION

1. Field of Invention

The present invention relates to fastening members and particularly relates to cylindrical lock members which may be utilized to fasten together tubing, wiring, cue joints, rods, plastic rods, etc., which requires merely a small twist in either direction to accomplish locking.

2. Prior Art

Various forms of fastening devices have been disclosed in the prior art. However, these fastening devices have exhibited a number of disadvantages. Some are provided with bulky protuberances for applying torque to the fastening means. Others are of intricate structure and difficult and expensive to manufacture.

OBJECTS OF THE INVENTION

It is accordingly an object of the present invention to provide a locking device comprising a pair of mating lock members to which various articles to be connected such as tubes or rods may be affixed, and which mating lock members may be locked together by a small twisting motion. It is an additional object to provide a locking device of the type described which may be locked by twisting in either direction. It is a further object to provide a locking device which provides a secure locking condition when the device is twisted into locked position. It is still another object to provide a locking device which is relatively simple and inexpensive to fabricate. Still other objects will readily present themselves to one skilled in the art upon reference to the ensuing specification, the drawing, and the claims.

BRIEF DESCRIPTION OF THE DRAWING

In the drawing,

FIG. 1 is a sectional view of a locking device according to the invention.

FIG. 2 is a cross-sectional view taken at the line 2—2 of FIG. 1, looking in the direction of the arrows, showing the device in locked condition.

FIG. 3 is a cross-sectional view taken at the same line as that of FIG. 2, showing the device in unlocked condition.

FIG. 4 is a side elevational assembly view showing the locking device with members separated.

FIG. 5 is an end view of one locking member taken at the line 5—5, looking in the direction of the arrows, and FIG. 6 is an end view of the other locking member taken at the line 6—6, looking in the direction of the arrows.

DESCRIPTION OF THE PREFERRED EMBODIMENT

Referring to the drawing, a coupling member 10 is shown, comprising a female member 11 and a male member 12. The female member 11 comprises a cylindrical base 13 recessed at one end to provide a ferrule 14 adapted to receive and have a tube 15 affixed thereto. The female member 11 is provided with an axial channel 16. At one end of the female member 11 is a recess defining a concentric or axial cylindrical channel 17 which is coaxial with the female member 11 and the main channel 16 thereof. Inwardly of the recess 17 is a recess defining a cylindrical channel 18 eccentric with respect to the female member 11 and the channel 16.

The male member 12 comprises a cylindrical base 22 having a recess defining a ferrule 23 at one end on which a tube 24 is affixed by any suitable means such as welding or press fitting. An axial channel 25 is provided which communicates with the axial channel 16 of the female member 11. A portion of the outer wall of the male member is recessed to provide an axial cylinder segment 26 coaxial with respect to the male member 12 and the channel 25, and adapted to rotate slidably within the coaxial cylindrical channel 17 of the female member. The male member 12 is additionally recessed to provide a curvilinear such as cylindrical member 27 eccentric with respect to the male member 12 and the channel 25, and which is adapted to be received in the eccentric cylindrical channel 18. The eccentric cylindrical channel 18 is designed to have a somewhat larger diameter than that of the eccentric cylindrical member 27. Consequently, when the two lock members are rotated with respect to each other, the eccentric cylindrical member is free to rotate over a limited angle. As the two lock members are rotated to the limited angle, the surface of the eccentric cylindrical member engages the surface of the eccentric cylindrical channel 18 and locks the two lock members together. Such locking may be accomplished by rotating the lock members in either direction with respect to each other.

In engaging and locking the eccentric lock members of the invention (FIG. 4), the male member 12 is inserted into the female member 11 to the position shown in FIGS. 1 and 3. In this position the members are free to rotate with respect to each other at the bearing surface between the coaxial cylindrical member 26 and the coaxial bearing surface of the chamber 17 of the female member 11. Further, as seen in FIG. 3, the eccentric member 27 and the eccentric chamber 18 are substantially coaxial with each other, and since the diameter of the chamber wall 18 is somewhat greater than that of the cylindrical member 27, the member 27 is free to rotate within the chamber 18. However, since rotation is confined by the bearing surfaces of the coaxial member 26 and coaxial chamber surface 17, the male and female lock members must rotate about their major axes. Consequently, when the lock members are rotated with respect to each other in either direction, the walls of the eccentric cylinder member 27 and the eccentric chamber 18 engage and lock the two lock members into position. By making the axis of the eccentric cylindrical member 27 and eccentric chamber 18 only slightly displaced from the axes of the lock members, a very strong locking force may be obtained forming a very positive lock axially between the two members. The members may be unlocked by rotation in the opposite direction. The locked position of the eccentric cylindrical member 27 and the eccentric chamber 18 are shown in FIG. 2.

The present invention has several advantages over prior art means for locking cylindrical or tubular structures. First, there are no laterally projecting protuberances from either member. Second, the engagement is positive and extremely secure. Further, the connector may be utilized to secure various types of structures such as rods, tubes, cables, chains, and various other structure. Additionally, the structure is relatively simple and inexpensive to produce.

It is to be understood that the invention is not to be limited to the exact details of operation or structures shown and described, as obvious modifications and equivalents will be apparent to one skilled in the art.

I claim:

1. An eccentric lock assembly comprising a pair of lock members having in the locked position a common axis, one of said lock members being a male lock member having a coaxial surface portion, a coaxial cylindrical portion set down from said surface portion thereby forming a shoulder, and an eccentric cylindrical portion set down from said coaxial cylindrical portion thereby forming a second shoulder, and the other lock member being a female lock member having complementary surface, coaxial, and eccentric portions, said coaxial portions having a close fit and said eccentric portions having a loose fit whereby the male lock member can be inserted into the female lock member and one said lock member rotated about said axis relative to the other said lock member over a substantial angle until the male eccentric portion binds against the female eccentric portion, and said surface portions in the locked position having common surface elements which terminate at the lip of said first named shoulder whereby irrespective of the relative rotation of the two lock members about the axis, the surface of one appears as an extension of the surface of the other.

2. An eccentric lock assembly according to Claim 1 adapted for connecting together two cylindrical tubes in which the male and female lock members have complementary axial bores and in which means is provided whereby the tubes can be connected to said lock members in flow-through communication through said axial bores, the coaxial surface portion of the lock members having the same diameter as that of the tubes so that when the tubes are connected to the lock members, the coaxial surface portions of said lock members and the surface of said tubes have comon elements whereby the said surfaces of the lock members and the surfaces of said tubes appear as part of the same cylindrical surface.

* * * * *